United States Patent
Finger

(10) Patent No.: US 10,467,415 B2
(45) Date of Patent: Nov. 5, 2019

(54) CONDITIONAL UPDATING BASED ON BOOTLOADER UNLOCK STATUS

(71) Applicant: T-Mobile USA, Inc., Bellevue, WA (US)

(72) Inventor: Joshua Patrick Finger, Covington, WA (US)

(73) Assignee: T-Mobile USA, Inc., Bellevue, WA (US)

(*) Notice: Subject to any disclaimer, the term of this patent is extended or adjusted under 35 U.S.C. 154(b) by 165 days.

(21) Appl. No.: 15/472,109

(22) Filed: Mar. 28, 2017

(65) Prior Publication Data

US 2018/0285568 A1    Oct. 4, 2018

(51) Int. Cl.
| | | |
|---|---|---|
| *G06F 9/00* | (2006.01) | |
| *G06F 15/177* | (2006.01) | |
| *G06F 21/57* | (2013.01) | |
| *G06F 9/4401* | (2018.01) | |
| G06F 8/654 | (2018.01) | |
| H04W 8/24 | (2009.01) | |

(52) U.S. Cl.
CPC .......... *G06F 21/575* (2013.01); *G06F 9/4406* (2013.01); *G06F 8/654* (2018.02); *H04W 8/245* (2013.01)

(58) Field of Classification Search
None
See application file for complete search history.

(56) References Cited

U.S. PATENT DOCUMENTS

| | | | | |
|---|---|---|---|---|
| 5,919,257 | A  * | 7/1999 | Trostle | G06F 21/575 726/22 |
| 7,237,121 | B2 * | 6/2007 | Cammack | G06F 21/10 380/255 |
| 8,181,028 | B1 * | 5/2012 | Hernacki | G06F 21/31 380/277 |
| 8,788,839 | B1 * | 7/2014 | Dong | G06F 21/575 713/187 |
| 9,883,479 | B2 * | 1/2018 | Deshpande | H04W 64/00 |
| 2003/0115471 | A1 * | 6/2003 | Skeba | H04L 63/0428 713/180 |
| 2003/0233558 | A1 * | 12/2003 | Lieberman | G06F 9/4416 713/189 |
| 2009/0031409 | A1 * | 1/2009 | Murray | H04N 21/462 726/10 |

(Continued)

*Primary Examiner* — Nitin C Patel
(74) *Attorney, Agent, or Firm* — Lee & Hayes, P.C.

(57) ABSTRACT

An unlockable bootloader of an electronic device may be unlocked by a user of the electronic device using a sanctioned bootloader unlocking process. An eligibility check may be performed through an interaction between the device and at least one network node(s) to determine whether a user of the electronic device is eligible to unlock the bootloader of the electronic device. If eligible, the user can provide user input to unlock the bootloader, causing the device to send an acknowledgement to the network, and, in response, the device receives a token from the network node. Upon receipt of the token, the electronic device can perform a first reboot, unlock the bootloader using the token, and perform a second reboot into the operating system with an unlocked bootloader. Due to the device-network interactions during the sanctioned bootloader unlocking process, one or more protection measures can be implemented, such as disabling software updates.

19 Claims, 7 Drawing Sheets

(56) References Cited

U.S. PATENT DOCUMENTS

| | | | |
|---|---|---|---|
| 2013/0031541 A1* | 1/2013 | Wilks | G06F 8/654 |
| | | | 717/176 |
| 2015/0019856 A1* | 1/2015 | Kim | G06F 21/575 |
| | | | 713/2 |
| 2017/0085469 A1* | 3/2017 | Chu | H04L 45/22 |
| 2017/0085649 A1* | 3/2017 | Ricket | H04L 67/125 |
| 2017/0140146 A1* | 5/2017 | Mehta | G06F 21/45 |
| 2018/0157840 A1* | 6/2018 | Crowley | G06F 21/575 |

* cited by examiner

CONDITIONAL UPDATING BASED ON BOOTLOADER UNLOCK STATUS

BACKGROUND

Today's technology development ecosystem includes a large developer community that innovates by obtaining off-the-shelf electronic devices, and developing new technologies (e.g., flashing custom software and/or custom firmware to the device) to create modified devices that operate in an innovative way. This type of development requires access to the bootloader of the electronic device so that newly developed technologies can be tested for operability and performance.

Today's bootloaders can be offered in an unlocked, locked, or unlockable state. Permanently unlocked bootloaders, while convenient for developers, are not practical for the everyday user, as they leave the operating system and kernel on the device unprotected. For example, a user may (knowingly or unknowingly) install third party applications on the device that are infected with malware. Permanently locked bootloaders, on the other hand, offer increased security, but are not practical for developers. In some cases, persistent developers with some level of sophistication will nevertheless exploit vulnerabilities on the device to circumvent a locked bootloader in an unauthorized manner. Accordingly, many device manufacturers provide unlockable bootloaders (i.e., locked on purchase, but unlockable), which allows the everyday user to experience a device with adequate security that runs the operating system specifically designed for the device, while allowing developers to unlock the bootloader for development purposes.

Despite the advantages provided by unlockable bootloaders, a service provider associated with the electronic device may not be engaged with the unlocking of a bootloader that occurs after the device is purchased. As an example, a user of a handset (e.g., a smart phone) may subscribe to a service providing entity called a "carrier" to access carrier services (e.g., mobile telephony services). The carrier, in this example, may not have any knowledge as to whether the bootloader of a handset sold from their retail store has been subsequently unlocked or not.

Without service provider engagement in the unlocking of a bootloader, a device may be unable to apply over-the-air (OTA) updates (e.g., software updates, such as security patches, etc.) that are pushed to the device, and the device may get stuck in a futile update "loop" where the repeatedly attempts to apply an update, and fails to do so. To illustrate this issue, a user may purchase a handset, unlock the bootloader, and modify the operating system and/or kernel of the handset in some way, which breaks the root of trust on the device, and, in turn, breaks the OTA pathing for installing updates on the device. Thereafter, an update servers may push a new security update to the handset, not knowing that the bootloader has been unlocked and that the root of trust has been broken. Meanwhile, the handset's OTA handler authenticates the build fingerprint of the device, but does not detect the broken root of trust, and, as a result, the OTA handler is unsuccessful in applying the security update, so it backs out of the update process, and tries, over and over again, to apply the update again, but is unsuccessful at each iteration. A device stuck in this loop can drain the device's battery. Furthermore, unnecessary network exchanges (i.e., consumption of network bandwidth) have occurred in this scenario because an update that cannot be applied on the device was unnecessarily transmitted over a network to the device.

Another issue caused by a lack of service provider engagement in the unlocking of a bootloader is the additional expense of support personnel resources in reaction to device modifications. For instance, a user who has unlocked the bootloader of his/her device may experience issues with the device resulting therefrom, and may contact support personnel of a service provider to provide technical support. These support personnel have been trained on approved device software/features that have been fully tested, and may therefore be unable to provide technical support to the user. If device issues are caused by the inability to install updates, as described above, this may cause the service provider to expend its own resources to build and test different security update packages that might be operable with a modified device.

Lastly, a service providing entity may pay out for an exchange of a device whose value has been compromised due to the unlocking of its bootloader when the service providing entity cannot detect that the bootloader has been unlocked (an unlocked bootloader is often inconspicuous on the device). The value of the device may be compromised in various ways due to bootloader unlocking. For example, as noted above, unlocked bootloaders leave the operating system and kernel unprotected, which may make the device more susceptible to malware and other security issues. Even with the latest security updates, an unlocked bootloader can allow malware intrusions if third party applications are installed on the device. As another example, a user may, in the process of flashing custom software and/or firmware, may overclock the processors on the device by driving them at higher frequencies and voltages than the frequencies and voltages for which they were designed. This may impact chipset performance as well as thermal thresholds, which can lead to a shorter lifespan of the device regardless of it being re-flashed back to the original/stock software (factory) image and relocking the bootloader. In these scenarios, if the user were to exchange their device at an authorized dealer of the service provider, and the unlocked bootloader was undetected at the time of the exchange, the carrier may pay out for significantly devalued device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
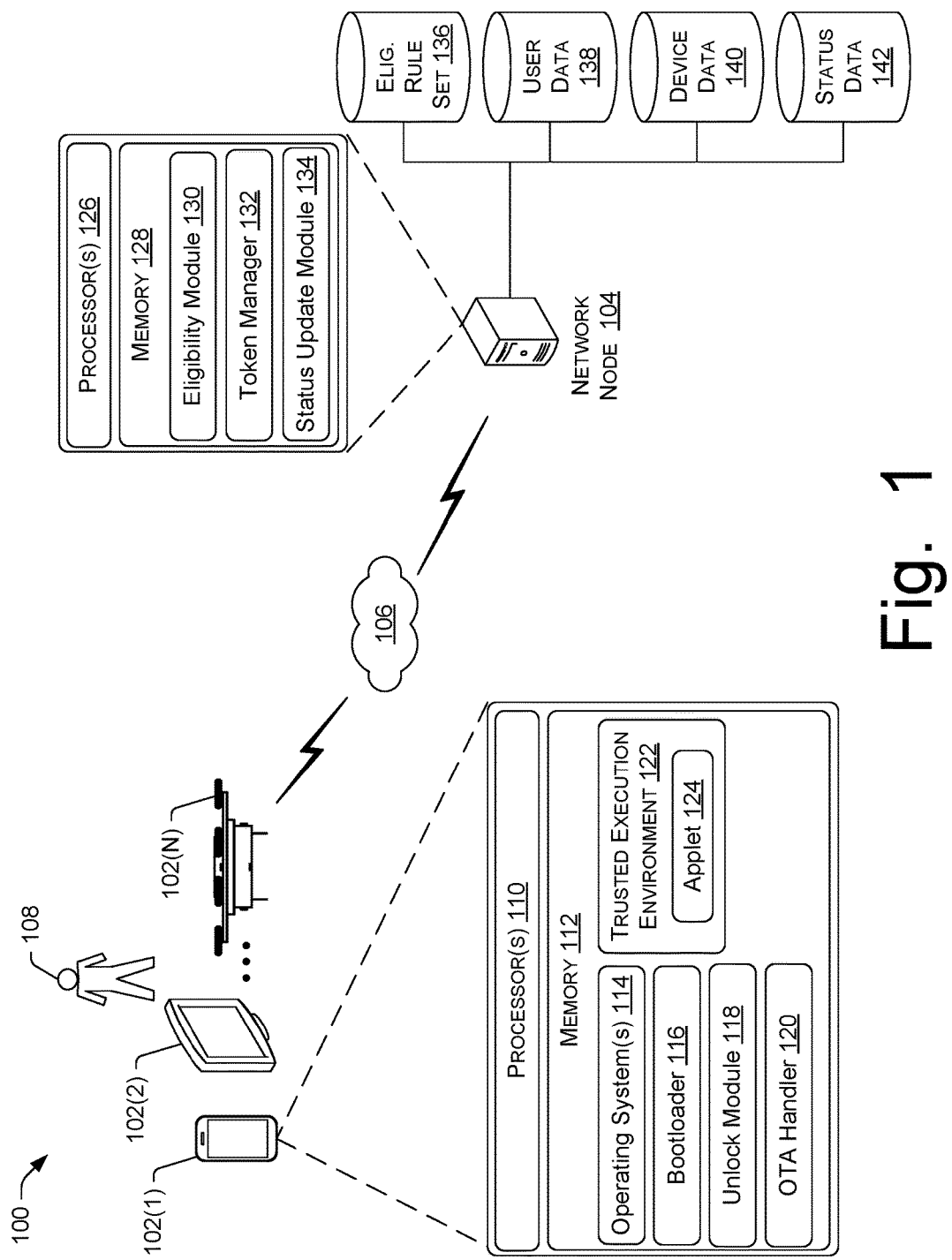
FIG. 1 illustrates an example environment that facilitates sanctioned bootloader unlocking of an electronic device.

Described herein are techniques and systems for implementing a sanctioned process for unlocking a bootloader of an electronic device. A bootloader of an electronic device is the first code that is executed when the electronic device is initialized (e.g., powered on, rebooted, etc.). For example, the bootloader is executed before any of the main software programs, including the operating system, even start to execute on the electronic device.

The sanctioned bootloader unlocking process described herein includes an eligibility check, which is carried out via an interaction between the electronic device and at least one remote network node. The eligibility check determines, as an initial matter, whether a user of the electronic device is eligible to unlock the bootloader of the electronic device. If the user is determined eligible via the eligibility check, the user can provide user input to unlock the bootloader. The electronic device can then send an acknowledgement to the at least one remote network node indicating that the user requested to unlock the bootloader, and, in response, the electronic device receives a token from the network node, the token being usable by the electronic device to unlock the bootloader in a sanctioned manner. Upon receipt of the token, the electronic device can perform a first reboot, unlock the bootloader using the token, and perform a second reboot into the operating system with an unlocked bootloader, thereby allowing a developer to modify the operating system and/or kernel of the device, such as by flashing custom software and/or firmware.

Because a service providing entity may operate the network node(s), the network node's involvement in the sanctioned bootloader unlocking process, as described herein, allows the service providing entity's systems to be engaged in the bootloader unlocking process. This allows one or more protection measures to be implemented in response to the unlocking of a bootloader on a particular device. At least one of the protection measures may be to disable software updates on the electronic device. This can be done on the network-side by updating a device status to indicate that software updates should not be provided to the electronic device, thereby causing an update server to refrain from sending updates to the electronic device. Disabling software updates can also be implemented on the client-side by configuring the electronic device to refrain from checking for, and/or downloading, available software updates after the bootloader has been unlocked using the sanctioned bootloader unlocking process described herein.

In some embodiments, the electronic device may be further configured to determine that, despite not having performed the sanctioned bootloader unlocking process, the device has been tampered with in an unauthorized manner. For instance, a module of the device can determine whether a token usable to unlock the bootloader has been received, and if not, the device can infer that a sanctioned bootloader unlocking process has not occurred. Thereafter, a module can determine if the device has been tampered with by the bootloader having been unlocked, and/or the operating system or kernel having been modified. If tampering is detected in this manner, the electronic device can send an instruction to a network node to update a status of the electronic device so that the network node can take one or more protection measures. Again, at least one protection measure can be to disable software updates from being sent to the electronic device from the network-side. The electronic device can also disable an update procedure by refraining from checking for, and/or downloading, available software updates over a computer network if the device has been tampered with.

Also disclosed herein are systems comprising one or more processors and one or more memories, as well as one or more non-transitory computer-readable media storing computer-executable instructions that, when executed, by one or more processors perform various acts and/or processes disclosed herein.

The techniques and systems describe herein provide a sanctioned (i.e., sanctioned by a service providing entity) way for eligible users to take control of their devices by unlocking a bootloader of the electronic device through the involvement of the service provider's system(s). Thus, a suitable level of protection can be left intact on the device (i.e., the bootloader is still locked upon purchase), while allowing developers the ability to modify their devices beyond what is typically allowed, and allowing for this modification in a sanctioned manner so that one or more protection measures can be taken to benefit the device itself and/or the systems and resources of a service providing entity, as described in more detail herein.

FIG. 1 illustrates an example environment 100 that facilitates sanctioned bootloader unlocking of an electronic device 102. As shown in FIG. 1, an electronic device, such as the electronic devices 102(1), 102(2), . . . , 102(N) (collectively 102), is configured to communicate with, and connect to, one or more network nodes 104 through over a computer network 106.

The network(s) 106 is representative of many different types of networks, and may include wired and/or wireless networks that enable communications between the various entities in the environment 100. In some embodiments, the network(s) 106 may include cable networks, the Internet, local area networks (LANs), wide area networks (WAN), mobile telephone networks (MTNs), and other types of networks, possibly used in conjunction with one another, to facilitate communication between the devices shown in FIG. 1. Although embodiments are described in the context of a web based system, other types of client/server-based communications and associated application logic could be used. In some embodiments, the network(s) 106 and/or the network node(s) 104 may represent all or part of an Internet Protocol Multimedia Subsystem (IMS) network for delivering Internet Protocol (IP) multimedia to electronic devices 102 associated with users 108 of the IMS network. An IMS core network (sometimes referred to as the "IMS core", or the "Core Network (CN)") permits wireless and wireline devices to access IP multimedia, messaging, and voice applications and services.

The electronic device 102 may be implemented as any suitable computing device configured to communicate over a wireless and/or wireline network, including, without limitation, a handset (e.g., a mobile phone) 102(1), a tablet computer, a laptop computer, a portable digital assistant (PDA), a wearable computer (e.g., electronic/smart glasses, a smart watch, fitness trackers, etc.), a networked digital camera, an electronic book (eBook) reader device, a set-top box, a game console, a smart television 102(2), an unmanned aerial vehicle (UAV) 102(N), a land vehicle (e.g., a motor vehicle), and/or similar electronic device. The terms "communication device," "wireless device," "wireline device," "mobile device," "computing device," "user equipment (UE)," "device," and "electronic device" may be used interchangeably herein to describe any electronic device 102 capable of performing the techniques described herein. Furthermore, the electronic device 102, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

The electronic device 102 may be equipped with one or more processors 110 and one or more forms of computer-readable memory 112. The memory 112 of the electronic device 102 can include one or more operating systems 114, a bootloader 116, an unlock module 118, an over-the-air (OTA) handler 120, and a trusted execution environment (TEE) 122 containing an applet 124.

The operating system(s) 114 may be any suitable operating system known to a person having ordinary skill in the art. The bootloader 116 represents the first code that is executed when the electronic device 102 is initialized. As such, upon startup of the electronic device 102, or upon any reboot, for example, the bootloader 116 is executed before the operating system 114 starts to execute. In some embodiments, the bootloader 116 packages instructions to boot the operating system kernel on the device 102. In this manner, the bootloader 116 may be configured to initiate boot sessions for the electronic device 102, such as by loading multiple boot stages in sequence during an initiated boot session. The bootloader 116 is locked upon purchase of the electronic device 102, and unlockable using the sanctioned bootloader unlocking process described herein.

The unlock module 118 is configured to act as a front end for the user 108 of the electronic device 102 to perform a sanctioned bootloader unlocking process, as described herein. In some embodiments, the unlock module 118 exposes one or more graphical user interfaces on a display of, or associated with, the electronic device 102. These user interface features will be described in more detail below with reference to FIGS. 4 and 5. The unlock module 118 may be configured to interact with the network node(s) to perform an eligibility status check to determine whether the user 108 is eligible to unlock the bootloader 116 of the electronic device 102. As part of this eligibility check, the unlock module 118 can send a request, over the computer network 106, to the network node(s) 104 to check the eligibility status of the user 108 of the electronic device 102 to unlock the bootloader 116. The request may include an identifier usable by the network node(s) 104 to lookup data associated with the user 108 and/or the device 102, and as such, the unlock module 118 may be configured to obtain the identifier from the memory 112 and/or from the user 108 via user input. The unlock module 118 may be further configured to receive eligibility status responses from the network node(s) 104 over the computer network 106, process those responses, and carry out a remainder of the sanctioned bootloader 116 unlocking process, as described herein. The bootloader 116 unlocking process on the electronic device 102 may involve interactions between the unlock module 118 and the applet 124 of the TEE 122, such as passing a token to the applet 124, and sending commands to the applet 124 to set flags indicating eligibility status of the user 108 and/or unlocked or tampered status of the device 102, as described herein.

The OTA handler 120 is configured to perform an update procedure that checks for, and downloads, available software updates for the electronic device 102 over the computer network 106. As used herein "software updates" can include any suitable software or firmware updates, including security update patches associated with security clients, such as anti-malware programs executing on the electronic device 102. Notably, the OTA handler 120 is configured to initially check in with the applet 124 of the TEE 122 to determine whether the bootloader 116 has been unlocked and/or whether the electronic device has been otherwise tampered with. If so, the OTA handler 120 may be configured to disable an OTA update procedure by refraining from checking for, and/or downloading, available software updates for the electronic device 102 over the computer network 106. This acts as a client-side protection measure that prevents the device 102 from getting stuck in an iterative loop of attempting and failing to apply software updates after the bootloader 116 has been unlocked and/or the device 102 has otherwise been tampered with.

The TEE 122 may represent an isolated environment on the electronic device 102 that executes in parallel with the operating system 114 and other applications in the operating system layer. The TEE 122 may have a higher security level than the operating system 114, access to components of the device 102 outside of the TEE 122, while being protected from user installed applications and other programs that run outside of the TEE 122. The applet 124 may represent a trusted application that utilizes secure measures, such as encryption, to protect and isolate the applet 124 from components external to the TEE 122 and even other components within the TEE 122.

The applet 124 of the TEE 122 may be configured to capture or set flags within the TEE 122 that indicate eligibility status of the user 108 for unlocking the bootloader 116, as well as a status of the device 102 in terms of whether the bootloader 116 has been unlocked via the sanctioned bootloader 116 unlocking process, or whether the device has been tampered with. For example, an "Unlock Eligible Yes" flag set by the applet 124 can indicate the user 108 is eligible (as determined via the eligibility check) to unlock the bootloader 116 on the device 102, and to thereafter unlock the bootloader 116 to flash custom software and/or firmware, which modifies the operating system 114 and/or kernel. An "Unlock Eligible No" flag set by the applet 124 can indicate that the user 108 has is ineligible (as determined via the eligibility check) to unlock the bootloader 116 on the device 102. A "Device Unlocked" flag set by the applet 124 can indicate that the user 108 was (i) already "Unlock Eligible Yes" and (ii) performed the sanctioned bootloader 116 unlocking process, as described herein. A "Device Tampered" flag set by the applet 124 can indicate that the operating system 114 and/or kernel was modified without performing eligibility check and the sanctioned bootloader 116 unlocking process, as described herein, regardless of the actual eligibility status of the user 108.

The applet 124 of the TEE 122 may be further configured to manage a token received over the computer network 106, the token being usable to unlock the bootloader 116. The applet 124 may be configured to check (e.g., upon every boot of the device 102, periodically, such as every 24 hours, or otherwise at multiple different times) to determine if the device 102 has been tampered with while there is no token present within the applet 124 of the TEE 122. The applet 124 may be further configured to check the device status flag when a token is present within the TEE 122 to determine if the "Device Unlocked" flag has not been set, because setting of the "Device Unlocked" flag is followed by a receipt of the token, and if the two conditions are not present at the same time, the status may be updated on the device 102 and/or from the perspective of the network node(s) 104.

Turning to the network node(s) 104 of FIG. 1, the network node(s) 104 may be equipped with one or more processors 126 and one or more forms of computer-readable memory 128. The memory 128 of the network node(s) 104 can include an eligibility module 130, a token manager 132, and a status update module 134. The network node(s) 104 may also have access to various types of data, such as an eligibility rule set 136, user data 138, device data 140, and/or status data 142.

The eligibility module 130 may be configured to receive eligibility status requests from electronic devices 102 over the computer network 106, to process the received requests using the eligibility rule set 136 against the user data 138 and/or the device data 140, and to send eligibility status responses to the electronic device 102 over the computer network 106. The eligibility module 130 may be further configured to update the eligibility rule set 136 by adding rules to, deleting rules from, and/or modifying the eligibility rules of, the eligibility rule set 136. In general, rules of the eligibility rule set 136 can be configurable, and are definable by a service providing entity that maintains and/or operates the network node(s) 104. In some embodiments, the eligibility rule set 136 includes, without limitation, a rule that the user 108 has been in good standing (e.g., paid subscription bills on time) with the service provider for at least a period of time (e.g., in good standing for the last 6 months), a rule that the user has paid off his/her electronic device 102, if purchased through the service providing entity, such as at a retail store of the service providing entity, and/or a rule that the user has paid off at least a threshold percentage or portion of the purchase price of the electronic device 102, among other suitable rules. The purpose of the eligibility rule set 136 is to use the rule set 136 to define or identify a subset of users 108 who are considered to be qualified to unlock the bootloader 116 of the electronic device 102. Although payment-related rules are described herein, the rules of the eligibility rule set 136 can take any form, without relation to payment status of the user 108. For example, the eligibility rule set 136 may include rules relating to geographical locations associated with users 108, or any other user-level parameter or metric.

The token manager 132 of the network node(s) 104 may be configured to receive, from the electronic device 102 over the computer network 106, acknowledgements and/or device status flags indicating user requests to unlock the bootloader 116. Upon receipt of such an acknowledgement and/or device status flag (e.g., "Device Unlocked" flag), the token manager 132 may be configured to generate or select a token, and send the token to the device 102 over the computer network 106 so that the device 102 can use the token to unlock the bootloader 116 in a sanctioned manner.

The status update module 134 may be configured to update the status data 142 based on interactions with the electronic device 102 in relation to bootloader 116 unlocking and/or device tampering. The status data 142 may include user status and/or device status data. For example, as a result of the eligibility check, the eligibility module 130 may determine that the user 108 is eligible or ineligible to unlock the bootloader 116, and the status update module 134 may update a user status of the user 108 to eligible or ineligible in accordance with the eligibility determination. Accordingly, the status data 142 may maintain an up-to-date user eligibility status of the user 108. This is due to the fact that the eligibility check may be executed at multiple different times to determine whether the eligibility status of the user 108 has changed since a previous eligibility determination.

The status update module 134 can also update a device status of the device 102 based on acknowledgements, update requests, and/or device status flags received from the electronic device 102 over the computer network 106. Accordingly, the status data 142 may maintain an up-to-date device status of the device 102 in terms of whether the bootloader 116 has been unlocked via the sanctioned bootloader unlocking process, whether the device 102 has been tampered with outside of the sanctioned bootloader unlocking process, and/or other status data, such as whether a warranty associated with the device 102 has been voided, whether the device 102 has been flagged as ineligible for trade-in or resale at an authorized device dealer, and/or whether software updates are disabled for the device 102, among other status data 142.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 2A:
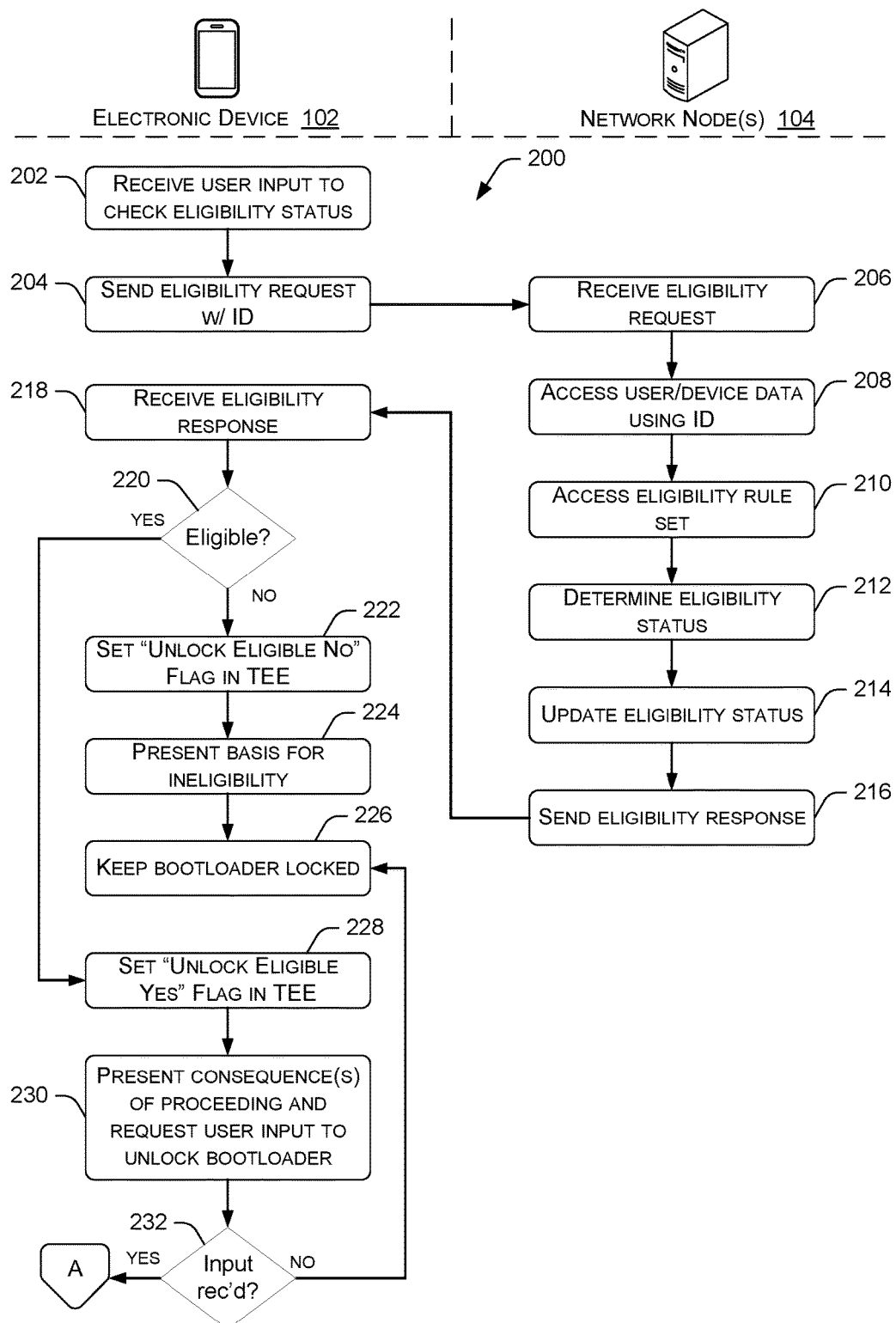
FIGS. 2A and 2B illustrate a flowchart of an example process for sanctioned bootloader unlocking.
Figure 2B:
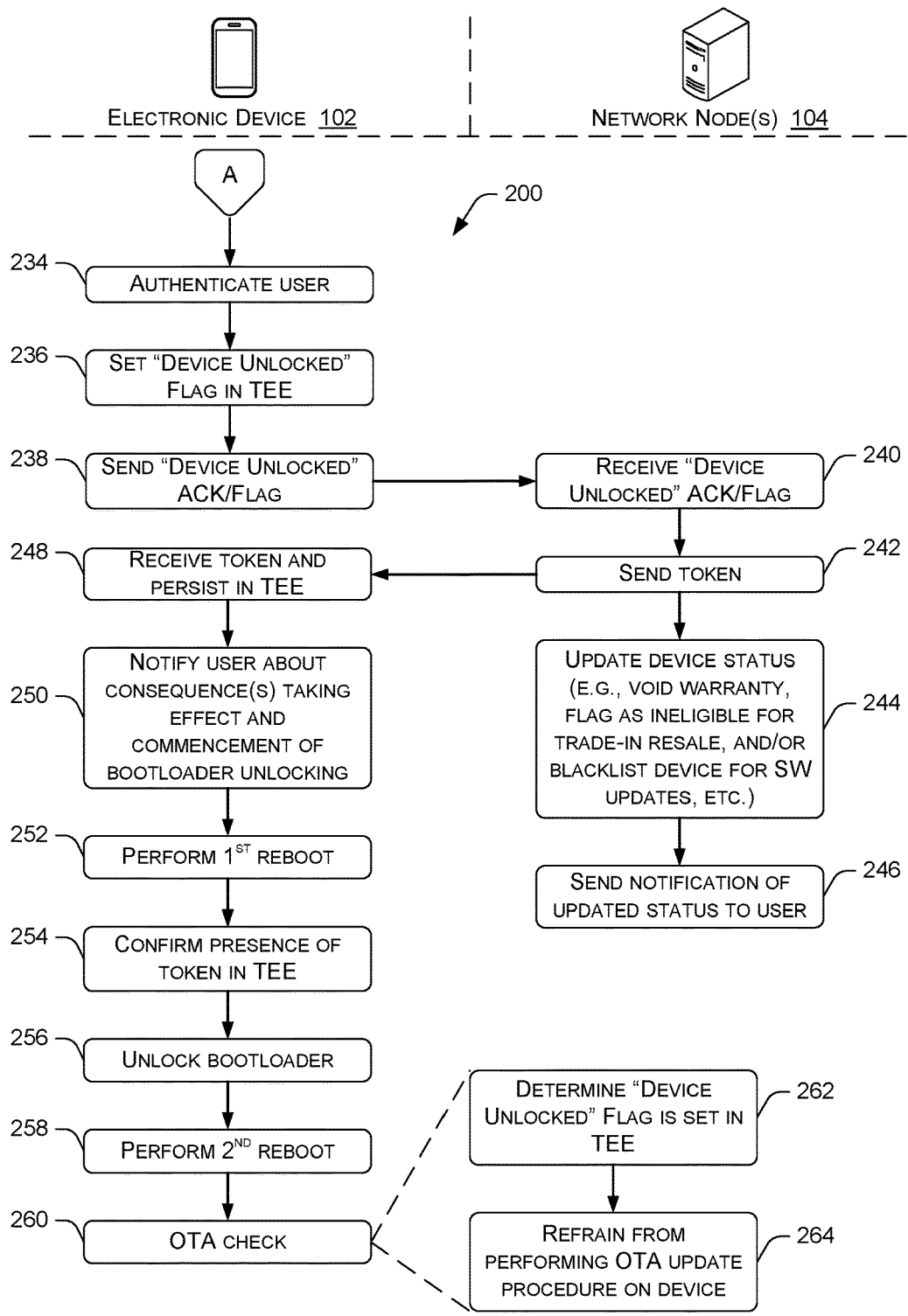

FIGS. 2A and 2B illustrate a flowchart of an example process 200 for sanctioned bootloader 116 unlocking. As illustrated in FIGS. 2A and 2B, part of the process 200 may be implemented by the electronic device 102 and part of the process 200 may be implemented by the network node(s) 104. As such, the process 200 involves an interaction(s) between the device 102 and the network node(s) 104 as an aspect of the sanctioned bootloader 116 unlocking process.

Figure 3:
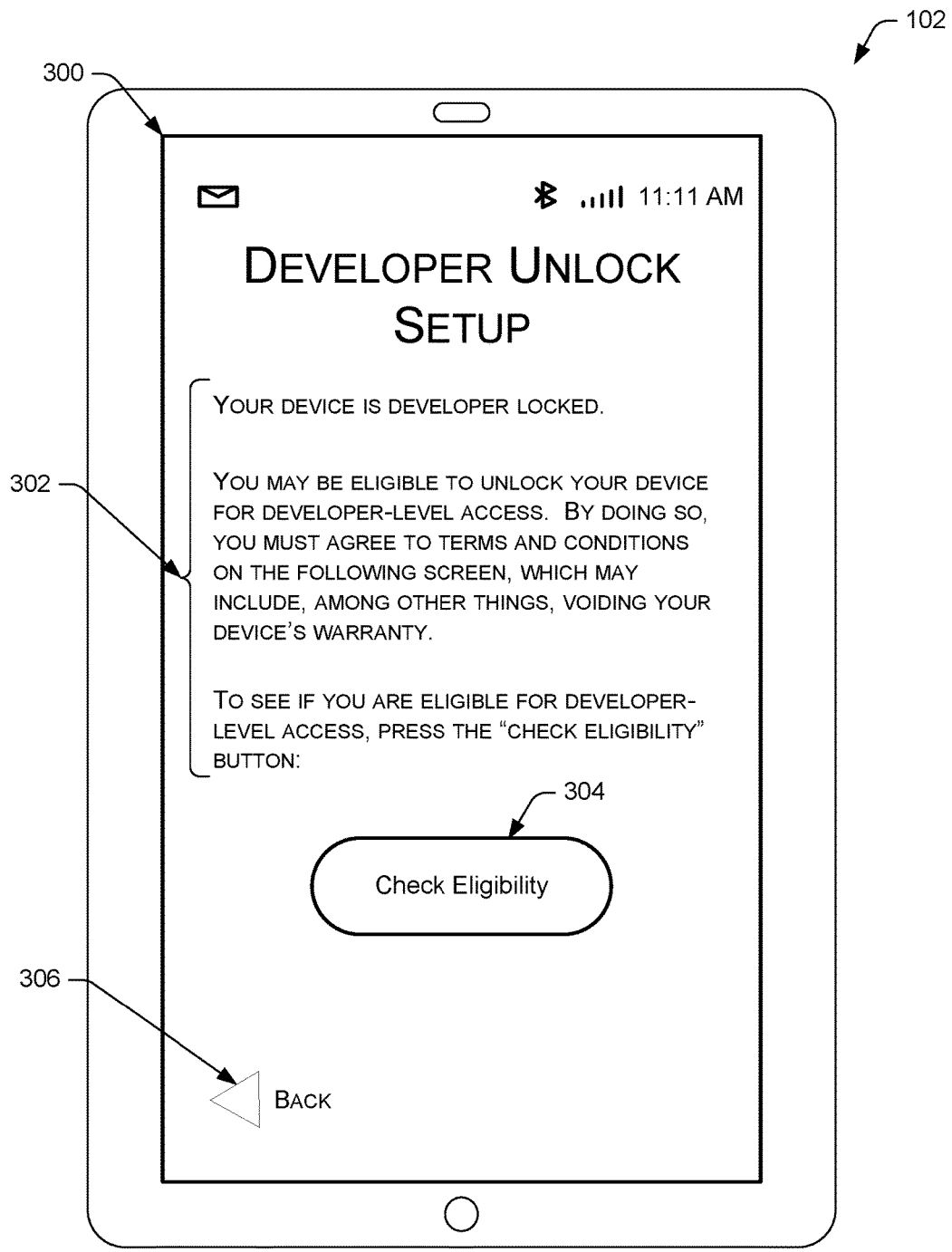
FIG. 3 illustrates an example user interface showing an eligibility check portion of a sanctioned bootloader unlocking process.

With reference to FIG. 2A, at block 202, the electronic device 104 may receive user input indicating a request by the user 108 to check his/her eligibility status for unlocking the bootloader 116 of the device 102. FIG. 3 illustrates an example user interface 300 that may be presented by the unlock module 118 on a display of, or associated with, the electronic device 102, and the user input received at block 202 may be received via the user interface 300, as an example. Turning briefly to FIG. 3, an example user interface 300 for receiving the user input at block 202 is shown. The user interface 300 may be invoked, for example, by the user 108 opening an application or program installed on the device 102. FIG. 3 shows an example as a "Developer Unlock Setup" application/program. In some embodiments, such as program may be accessed via a settings menu of the device 102. The user interface 300 may include information 302 indicating that the bootloader 116 of the device 102 is currently locked, and that the user 108 may be eligible to unlock the bootloader 116 to gain developer-level access on the device 102. The information 302 may include/specify, or may otherwise indicate the existence of, consequences (e.g., terms and conditions) for unlocking the bootloader 116. FIG. 3 includes an example consequence specified as "voiding the device's warranty," but other consequences than the one shown in FIG. 3 may be specified, or the information 302 may not explicitly specify any consequences, but may instead apprise the user 108 that there are consequences of unlocking the bootloader 116, which may be revealed if the user 108 wishes to proceed. The user interface 300 may further include a selection element 304 (e.g., a "check eligibility button") to initiate the eligibility check process described herein. An additional selection element 306 (e.g., a back, dismiss, or exit button) may be presented on the user interface 300 for allowing the user 108 to exit out of the user interface 300, such as when the user 108 decides not to proceed with the eligibility check and subsequent bootloader 116 unlocking process.

Returning to FIG. 2A, the user input received at block 202 may be in the form of a user 108 selecting the selection element 304 to initiate the eligibility check process. The user input may be received via an input device of the electronic device 102 (e.g., a touch screen, a pointing device, voice input, etc.). It is to be appreciated that the unlock module 118 may not present the user interface 300, or any user interface for that matter, and may therefore omit block 202 from the process 200 by starting at block 204. This may occur when the eligibility check is programmatically initiated by the unlock module 118 without any user input.

At 204, the unlock module 118 may send, to the network node(s) 104 over the computer network 106, a request for an eligibility status of a user 108 of the electronic device 102, the eligibility status relating to an eligibility to unlock a bootloader 116 of the electronic device 102. The request sent at block 204 may include an identifier associated with the user 108. For example, the identifier can include, without limitation, a Mobile Station International Subscriber Directory Number (MSISDN), an International Mobile Equipment Identity (IMEI), a model identifier of the device 102, a manufacturer of the device, a software build associated with the device 102, an IP address, a media access control (MAC) address, a user name provided by the user 108 via user input, or any other type of identifier that is usable to identify the user 108 and/or the device 102 associated with the user 108.

At 206, the eligibility module 130 of the network node(s) 104 may receive, from the electronic device 102 over the computer network 106, the request for the eligibility status of the user 108 of the electronic device 102 to unlock a bootloader 116 of the electronic device 102, the request including the identifier associated with the user 108.

At 208, the eligibility module 130 may access user data 138 associated with the user 108 and/or device data 140 associated with the electronic device 102 based at least in part on the identifier received with the eligibility status request at block 206. That is, the user data 138 and/or the device data 140 may be searchable using the identifier such that the user data 138 pertaining to the user 108 can be retrieved and/or the device data 140 pertaining to the device 102 can be retrieved using the identifier as a query term in an application programming interface (API), for example. The user data 138 accessed at block 208 may include payment-related data associated with the user 108, such as a payment history regarding a loan or lease on the device 102, a payment history regarding a subscription service (e.g., a mobile telephony service) where the subscription service is defined by periodic (e.g., monthly) or usage-based (e.g., data used) subscription charges. The user data 138 accessed at block 208 can additionally, or alternatively, include geographical data associated with the user 108, such as a shipping or billing address, a current location of the electronic device 102, a location derived from an IP address, and the like. The device data 140 accessed at block 208 may include any suitable data about the device 102, such as a make of the device 102, a model of the device 102, a software build of the device 102, an operating system version running on the device 102, a device manufacturer of the device 102, performance specifications of the device 102, and/or any other device-level data.

At 210, the eligibility module 130 may access a set of eligibility rules 136. At 212, the eligibility module 130 may determine an eligibility status of the user 108 by comparing the accessed user data 138 and/or device data 140 against the set of eligibility rules 136 to determine if the rule set 136 is satisfied by the user data 138 and/or the device data 140. For example, the set of eligibility rules 136 may include a rule that the user 108 is to be in good standing with his/her service provider for at least a period of time (e.g., 6 months) to be eligible to unlock the bootloader 116 of the device 102. If the user data 138 indicates that the user 108 is in good standing, and has been in good standing for at least the period of time, then the set of eligibility rules 136 may be satisfied in this instance, and the eligibility module 130 may determine, at block 212, that the user 108 is eligible to unlock the bootloader 116 of the device 102. If an eligibility rule is not satisfied (e.g., the user missed a subscription payment within the period of time and was flagged as not being in good standing as a result), the determination at block 212 may instead be that the user 108 is ineligible to unlock the bootloader 116 of the device 102.

At 214, the status update module 134 may update the status data 142 associated with the user 108 based on the determination at block 212. For example, the status data 142 may be updated with "Unlock Eligible Yes" or "Unlock Eligible No" for the user 108 in question.

At 216, the eligibility module 130 may send, to the electronic device 102 over the computer network 106, a response to the request it received at block 206, the response indicating that the user 108 is either eligible or ineligible to unlock the bootloader 116, depending on the eligibility status determined at block 212. At 218, the unlock module 118 of the electronic device 102 may receive, from the network node(s) 104 over the computer network 106, the response to the eligibility status request indicating that the user 108 is either eligible or ineligible to unlock the bootloader 116.

At 220, the unlock module 118 may determine whether the response indicates that the user 108 is eligible or ineligible to unlock the bootloader 116. If the response received at block 218 indicates that the user 108 is ineligible to unlock the bootloader 116, the process 200 proceeds along the "no" route from block 220 to block 222, where a flag may be set or captured within the applet 124 of the TEE 122 to indicate that the user 108 is ineligible to unlock the bootloader 116. Such a flag may be set to "Unlock Eligible No", indicating this ineligible status.

At 224, a basis for the ineligibility determination may be presented on a display of, or associated with, the device 102. For example, a user interface may be generated with the following text: "Sorry, you are ineligible to unlock developer-level access on this device because you are not current on your service subscription payments. Please check back later."

At 226, the bootloader 116 remains locked due to the ineligible determination for the user 108 of the device 102. If, at block 220, it is determined, from the response received at block 218, that the user 108 is eligible to unlock the bootloader 116, the process 200 may follow the "yes" route from block 220 to block 228 where a flag may be set or captured within the applet 124 of the TEE 122 to indicate that the user 108 is eligible to unlock the bootloader 116. Such a flag may be set to "Unlock Eligible Yes", indicating this eligible status.

Figure 4:
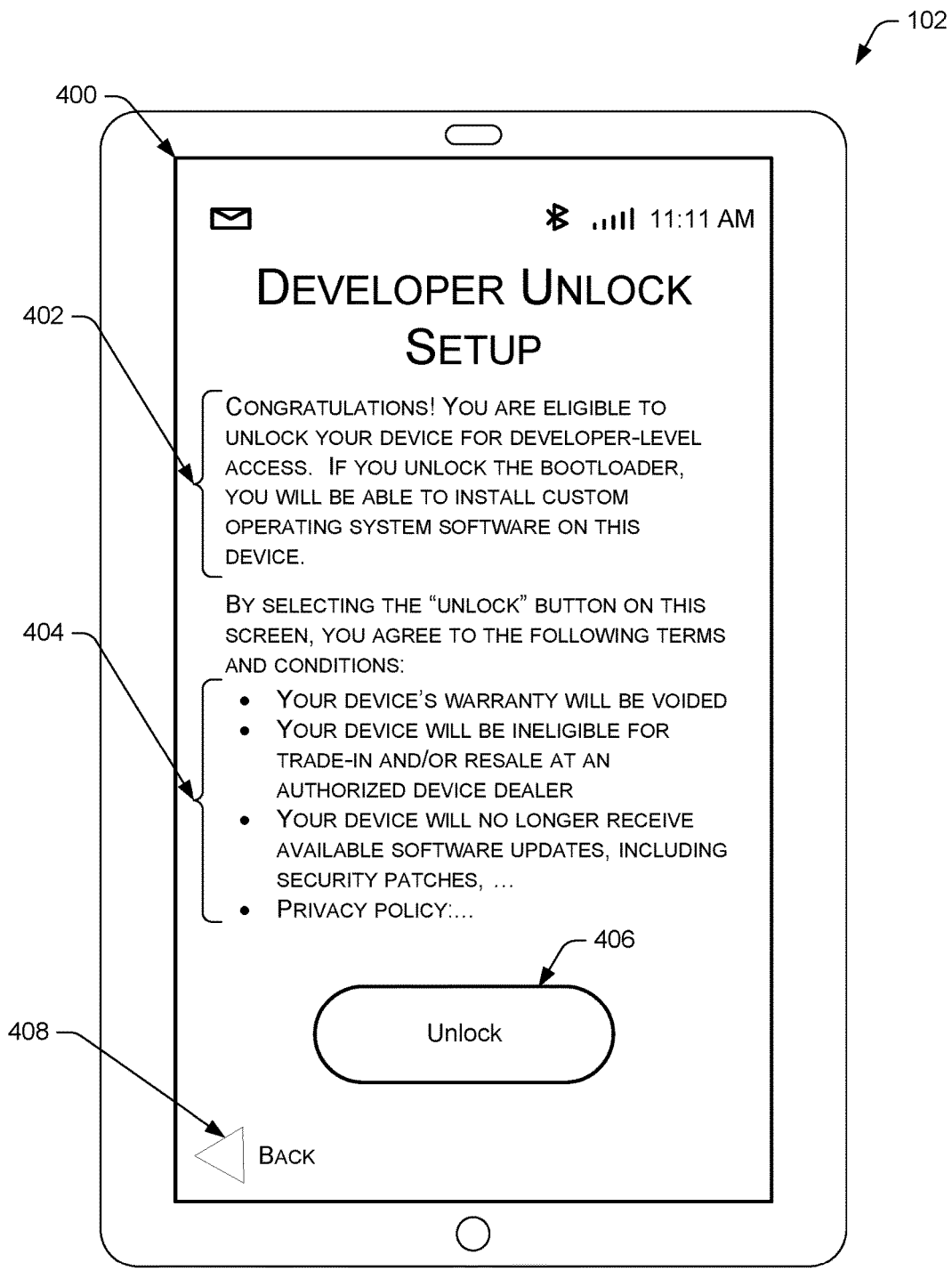
FIG. 4 illustrates an example user interface showing an unlocking portion of a sanctioned bootloader unlocking process.

At 230, the unlock module 118 may present, on a display of the electronic device, information indicating one or more consequence of unlocking the bootloader 116, and a request for user input to proceed with unlocking the bootloader 116. The consequence(s) may be presented so that the user 108 is informed of the consequences of providing the requested user input. FIG. 4 illustrates an example user interface 400 that may be presented by the unlock module 118 on a display of, or associated with, the electronic device 102, at block 230. Turning briefly to FIG. 4, an example user interface 400 is shown. The user interface 400 may be invoked, for example, in response to the user selecting the selection element 304 (e.g., the "check eligibility" button) shown in FIG. 3, and a determination that the user 108 is eligible to unlock the bootloader 116. The user interface 400 may include information 402 about the user's 108 eligible status, and a description of what will be gained by unlocking the bootloader 116, such as the ability to install custom software and/or firmware on the device. The user interface 400 may further include one or more consequences 404 that are presented at block 230 of the process 200. The consequences 404 can include, without limitation, voiding a warranty associated with the electronic device 102, the electronic device 102 becoming ineligible for trade-in or resale at an authorized device dealer (e.g., at a retail store of the service providing entity, such as a carrier, providing service to the user 108 via the device 102), and/or disabling software updates for the electronic device 102 (e.g., by adding the device 102 to a blacklist of devices that should not be provided software updates). The user interface 400 may further include a selection element 406 (e.g., an "unlock" button) that is selectable by the user to initiate continue the sanctioned bootloader 116 unlocking process. The user input may be received via an input device of the electronic device 102 (e.g., a touch screen, a pointing device, voice input, etc.). An additional selection element 408 (e.g., a back, dismiss, or exit button) may be presented on the user interface 400 for allowing the user 108 to exit out of the user interface 400, such as when the user 108 decides not to proceed with the sanctioned bootloader 116 unlocking process, and wishes to keep the bootloader 116 locked.

Returning to FIG. 2A, at decision block 232, the unlock module 118 may determine whether user input is received requesting to unlock the bootloader 116. For example, the unlock module 118 may monitor for selection of the selection element 406 of the user interface 400 shown in FIG. 4. If the requested user input is not received (e.g., the user provides no user input or different user input, such as by selecting the additional selection element 408 of the user interface 400 to back out of the unlocking process), the process 200 may follow the "no" route from block 232 to block 226 where the bootloader remains locked. If, on the other hand, user input requesting to unlock the bootloader 116 is received (e.g., the selection element 406 is selected by the user 108), the process 200 may follow the "yes" route from block 232 to block 234 in FIG. 2B, as shown by the off-page reference "A" in FIGS. 2A and 2B.

At 234, the unlock module 118 may authenticate the user 108 via an authentication procedure using the electronic device 102. Any suitable authentication procedure can be utilized to authenticate the user 108 at block 234, such as by obtaining a fingerprint via a fingerprint reader on the device 102 and validating the obtained fingerprint against a fingerprint of the user 108 on record, obtaining and validating an iris scan in a similar manner, a username and password credential check, or any similar authentication procedure.

At 236, the unlock module 118 may cause a flag to be set or captured within the applet 124 of the TEE 122 to indicate that the bootloader 116 has been unlocked. Such a flag may be set to "Device Unlocked", indicating this unlocked status of the bootloader 116.

At 238, the unlock module 118 may send, to the network node(s) 104 over the computer network 106, an acknowledgement and/or the "Device Unlocked" flag indicating that the user 108 requested to unlock the bootloader 116. At 240, the network node(s) 104 may receive, from the device 102 over the computer network 106, the acknowledgement and/or the "Device Unlocked" flag indicating that the user 108 requested to unlock the bootloader 116.

At 242, the token manager 132 of the network node(s) 104 may send, to the device 102 over the computer network 106, a token that is usable to unlock the bootloader 116. This token may be generated by the token manager 132 (e.g., by a pseudo-random number generator), selected from a list of preexisting tokens, or obtained by any other suitable technique. The token acts as a key that is usable to unlock the bootloader 116. In some embodiments, the token may be signed by the token manager 132 using a cryptographic technique so that the unlock module 118 can verify the authenticity of the token.

At 244, the status update module 134 may update a status associated the electronic device 102 to an updated status within the status data 142. In some embodiments, the updating at block 244 can comprise updating a database (e.g., a database with the status data 142) with information indicating at least one of: (i) a warranty associated with the electronic device 102 is void, (ii) the electronic device 102 is ineligible for trade-in or resale at an authorized device dealer, or (iii) software updates should not be provided to the electronic device 102.

At 246, the status update module 134 may send a notification message to the user 108 regarding the updated status. The notification sent at block 246 can be communicated using any suitable communication channel, such as Short Message Service (SMS) text, electronic mail (email), Rich Communication Services (RCS) messaging, and so on. Such a notification may inform the user as follows: "We noticed your device's software integrity has been compromised. Based on this, we cannot send down security updates, which puts your device at a security risk. Please see your nearest carrier store if this is a concern."

At 248, the unlock module 118 may receive the token sent at block 242 over the computer network 106 from the network node(s) 104, and may persist the token in the applet 124 of the TEE 122. The persisting of the token is done in such a way that the token remains in the applet 124 of the TEE 122 after any subsequent reboot of the device 102.

At 250, the unlock module 118 may present a notification to the user 108 on a display of, or associated with, the device 102 indicating that their warranty has been voided, or that some other consequence presented at block 230 is taking effect, and that the bootloader 116 is now being unlocked.

At 252, the electronic device 102 performs a first reboot. This first reboot at block 252 may be a reboot into a bootloader 116 mode or stage. The first reboot at block 252 may include execution of a command, which may be an automated command, or a command line entry command (e.g., Fast Boot OEM unlock).

At 254, the bootloader 116 may confirm a presence of the token in the applet 124 of the TEE 122 in order to authenticate against the token. At 256, in response to confirming the presence of the token after the first reboot, the bootloader 116 is unlocked. In this manner, the token is used as a key to unlock the bootloader 116.

At 258, in response to unlocking the bootloader 116, the electronic device 102 performs a second reboot. This time, the device 102 reboots into the operating system mode or stage. In some embodiments, a notification may be provided to the user 108 on a display of, or associated with, the device 102 that informs the user 108 that the bootloader is unlocked. This can be in the form of a graphical icon (e.g., an unlocked padlock), a text-based message such as "your device has been unlocked", or any similar notification. The device 102 may also perform a master reset, in some embodiments.

At 260, an over-the-air (OTA) check may be performed by the OTA handler 120 of the device 102. The OTA check performed at block 260 may include determining, by the OTA handler 120, that a particular flag has been set within the applet 124 of the TEE 122, as shown at block 262. The particular flag can be the "Device Unlocked" flag which indicates that the bootloader 116 has been unlocked.

At 264, in response to determining that the "Device Unlocked" flag is set in the applet 124 of the TEE 122, the OTA handler 120 can refrain from performing an update procedure that checks for, and downloads, available software updates for the electronic device 102 over the computer network 106. That is, the software update logic can be disabled on the device 102 in response to determining that the bootloader 116 has been unlocked via the sanctioned bootloader 116 unlocking process. This protects the device 102 by preventing the device 102 from getting stuck in an endless loop where it tries to apply software updates, but fails to do so because of a modification to the operating system 114 or kernel of the device after the bootloader 116 has been unlocked. The device 102 will also avoid needless consumption of network bandwidth because it will no longer check for available updates, and it will save battery in the process. As noted above, at block 244, software updates can be disabled from the network side as well for added protection.

It is to be appreciated that the device 102 may further include logic to periodically scan for any elevated privileges and/or access associated with components of the device 102 as another mechanism for triggering a bootloader 116 unlocking process.

Figure 5:
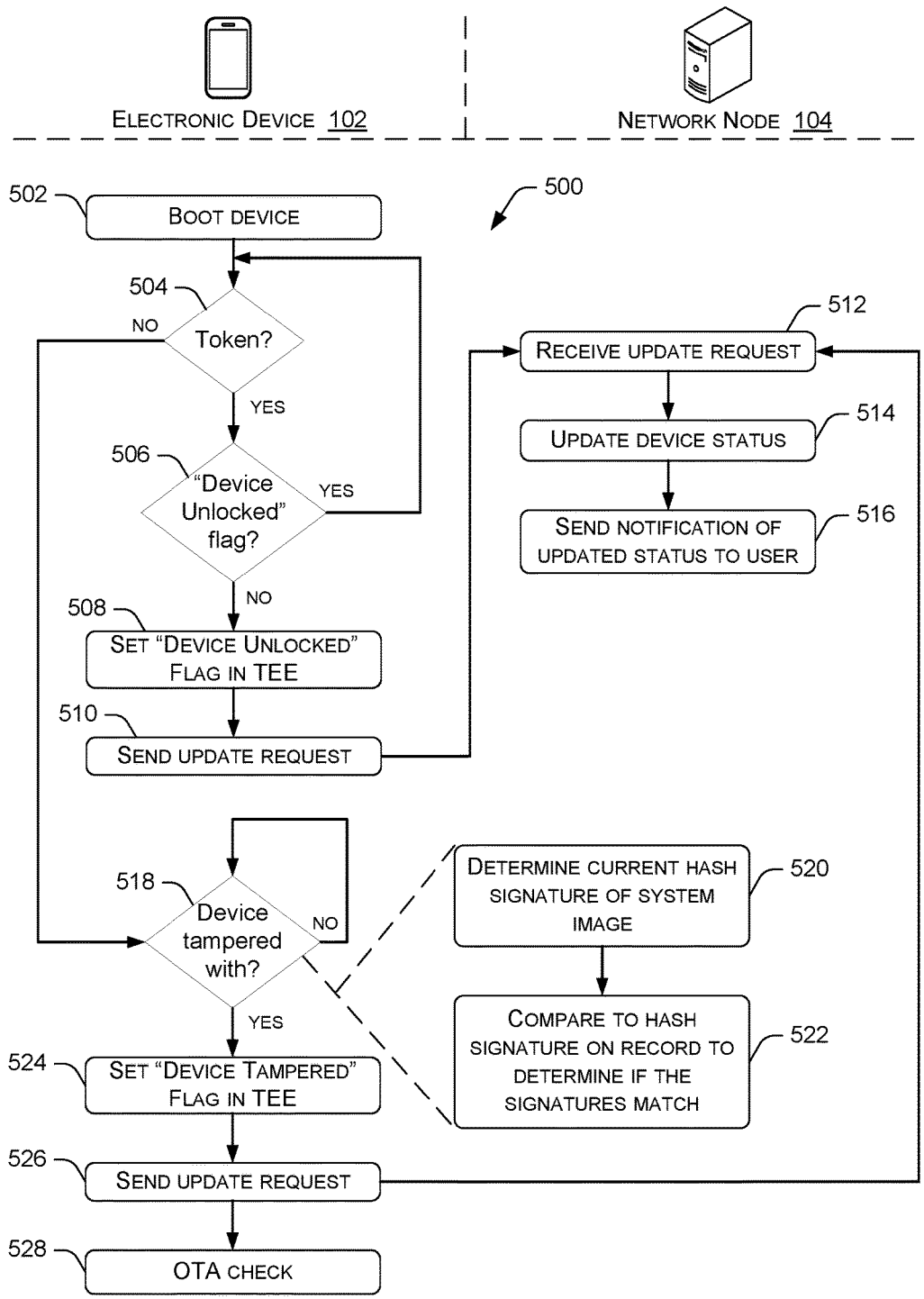
FIG. 5 illustrates a flowchart of an example process for service provider notification of on-device tamper detection.

FIG. 5 illustrates a flowchart of an example process 500 for service provider notification of on-device tamper detection. As illustrated in FIG. 5, part of the process 500 may be implemented by the electronic device 102 and part of the process 500 may be implemented by the network node(s) 104. As such, the process 500 involves an interaction(s) between the device 102 and the network node(s) 104 as an aspect of the tamper detection process.

At 502, the electronic device 102 boots up, such as by virtue of powering on the device 102, rebooting the device 102, or the like. At 504, the applet 124 of the TEE 122 may determine whether a token usable to unlock a bootloader 116 of the electronic device 102 is contained (or present) within the TEE 122. If a token is contained in the TEE 122, the process 500 may follow the "yes" route from block 504 to block 506 where the applet 124 determines whether a "Device Unlocked" flag is set within the applet 124. If the "Device Unlocked" flag is set within the applet 124 of the TEE 122, the process 500 may follow the "yes" route from block 506 back to block 504 to iterate by periodically (e.g., every 24 hours) checking for the presence of the token and the flag.

If, at block 506, the applet 124 determines that the "Device Unlocked" flag has not been set within the applet 124 whilst the token is contained within the TEE 122, the process 500 may follow the "no" route from block 506 to block 508 to set the "Device Unlocked" flag in the applet 124 of the TEE 122. This is because the presence of the token indicates that the user 108 has previously gone through the sanctioned bootloader 116 unlocking process, so the "Device Unlocked" flag should have been set during this process.

At 510, the electronic device 102 may send, over the computer network 106, an update request (e.g., an instruction) to update a status associated with the electronic device 102 to an "unlocked" status. At 512, the network node(s) 104 may receive, from the device 102 over the computer network 106, the instruction to update the status of the electronic device 102 to an unlocked status.

At 514, the status update module 134 of the network node(s) 104 may update the status of the device to "Device Unlocked". In some embodiments, the updating at block 514 can comprise updating a database (e.g., a database with the status data 142) with information indicating at least one of: (i) a warranty associated with the electronic device 102 is void, (ii) the electronic device 102 is ineligible for trade-in or resale at an authorized device dealer, or (iii) software updates should not be provided to the electronic device 102.

At 516, the status update module 134 may send a notification message to the user 108 regarding the updated status. The notification sent at block 514 can be communicated using any suitable communication channel, such as SMS text, email, RCS messaging, and so on. Such a notification may inform the user as follows: "We noticed your device's software integrity has been compromised. Based on this, we cannot send down security updates, which puts your device at a security risk. Please see your nearest carrier store if this is a concern."

Returning to block 504, if the applet 124 of the TEE 122 determines that a token is not contained in the TEE 122, the process 500 may follow the "no" route from block 504 to block 518 where the applet 124 determines whether the device 102 has been tampered with. Determining whether the device 102 has been tampered with at block 518 may include determining at least one of: (i) that the bootloader 116 has been unlocked, (ii) that the operating system 114 of the electronic device 102 has been modified, or (iii) that the kernel of the electronic device 102 has been modified. In some embodiments, this determination at block 518 may include determining a current hash signature of a system image installed on the electronic device 102, as shown at block 520, and comparing the current hash signature of the system image to a hash signature of the system image that is on record for the electronic device 102 to see if the signatures match. This on-record hash signature may be obtained over the computer network 106 from the network node(s) 104 by accessing the device data 140 for the electronic device 102. If the signatures match, and/or the device 102 is otherwise determined to have not been tampered with, the process 500 may follow the "no" route from block 518 to iterate the tamper detection check, such as by periodically (e.g., every 24 hours) checking to see if the device 102 has been tampered with whilst the token is not present within the TEE 122.

If, on the other hand, the hash signatures no not match at block 522, and/or the device 102 is otherwise determined to have been tampered with, the process 500 may follow the "yes" route from block 518 to block 524 where a "Device Tampered" flag is set within the applet 124 of the TEE 122.

At 526, the electronic device 102 may send, over the computer network 106, an update request (e.g., an instruction) to update a status associated with the electronic device 102 to a "tampered" status, where after, the network node(s) 104 may receive, from the device 102 over the computer network 106, the instruction to update the status of the electronic device 102 to a tampered status at block 512, and proceed to block 514, this time updating the status of the device to "Device Tampered" within the status data 142. In some embodiments, the updating at block 514 can comprise updating a database (e.g., a database with the status data 142) with information indicating at least one of: (i) device at risk, investigate upon exchange (e.g., so that it can be determined at the time of a future exchange at an authorized device dealer whether the device is eligible for trade-in or resale, and/or whether the warranty should be voided), or (ii) software updates should not be provided to the electronic device 102.

At 528, an OTA check may be performed by the OTA handler 120 of the device 102. Although not shown in FIG. 5, it is to be appreciated that an OTA check similar to the OTA check at block 260 of the process 200 in FIG. 2B may be performed by the OTA handler 120 following block 510 when the "Device Unlocked" flag has been set in the TEE 122, which can have a similar result of disabling the update procedure on the device 102, as described with references to blocks 262 and 264 of FIG. 2B.

The OTA check performed at block 528 may be similar, except that the OTA handler 120 determines whether the "Device Tampered" flag has been set within the applet 124 of the TEE 122, instead of the "Device Unlocked" flag. In response to determining that the "Device Tampered" flag is set in the applet 124 of the TEE 122, the OTA handler 120 can refrain from performing an update procedure that checks for, and downloads, available software updates for the electronic device 102 over the computer network 106. That is, the software update logic can be disabled on the device 102 in response to determining that the device 102 has been tampered with. This protects the device 102 by preventing the device 102 from getting stuck in an endless loop where it tries to apply software updates, but fails to do so because of a modification to the operating system 114 or kernel of the device after the bootloader 116 has been unlocked in an unauthorized manner (i.e., outside of the sanctioned bootloader 116 unlocking process). The device 102 will also avoid needless consumption of network bandwidth because it will no longer check for available updates, and it will save battery in the process.

Figure 6:
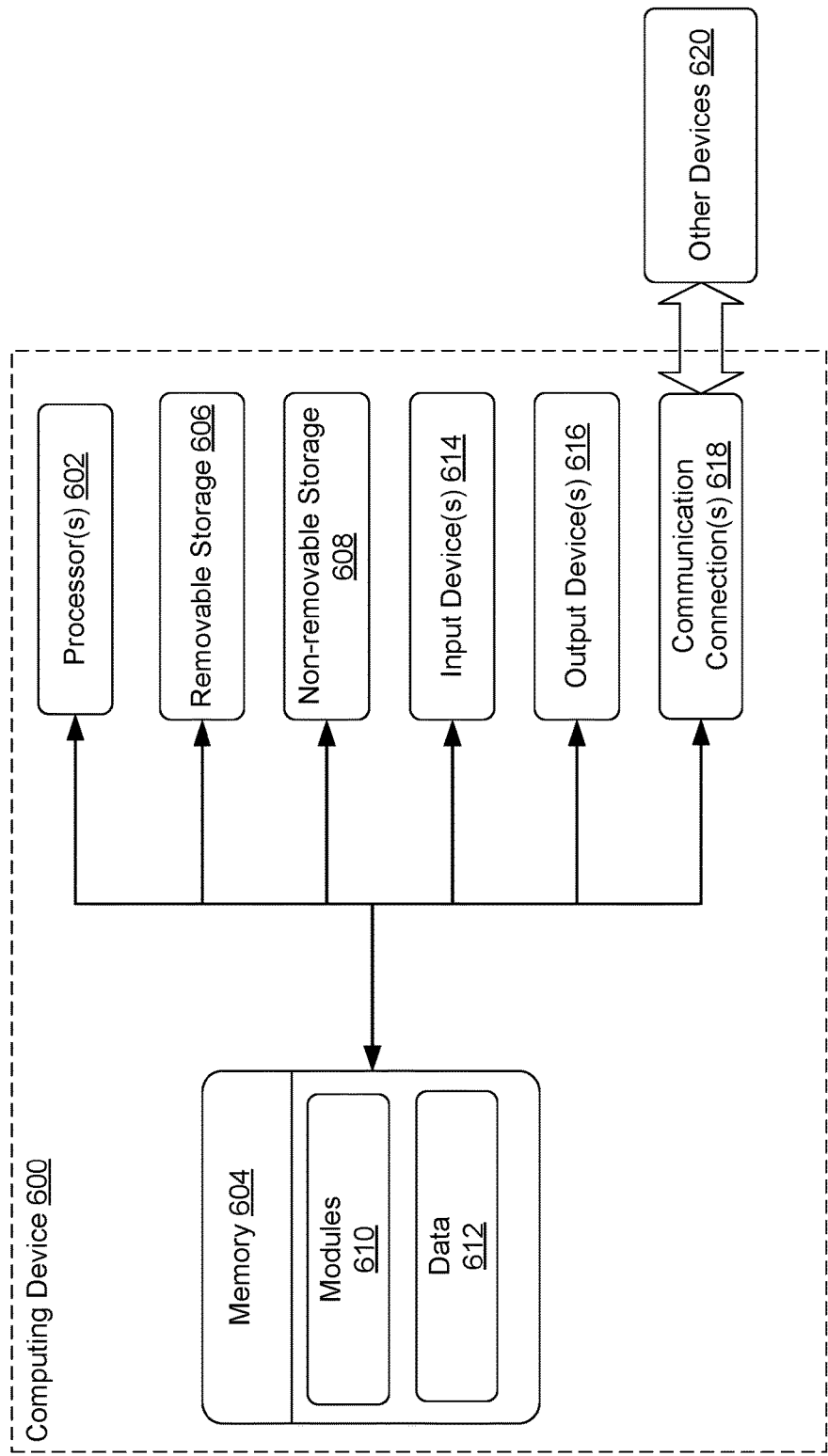
FIG. 6 is a block diagram of an example computing architecture in accordance with various embodiments.

FIG. 6 is a block diagram of an example computing architecture of a computing device 600 in accordance with various embodiments. The computing device 600 may represent the electronic device 102 or the network node(s) 104, as described herein. FIG. 6 shows the computing device 600 as including one or more processors 602 and memory 604. In some configurations, the processor(s) 602 can include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof. Depending on the exact configuration and type of computing device 600, the memory 604 can include volatile (e.g., random access memory (RAM)), non-volatile (e.g., read only memory (ROM), flash memory, etc.), or some combination of the two.

The computing device 600 can also include additional data storage devices (removable and/or non-removable) such as, for example, magnetic disks, optical disks, or tape. Such additional storage is illustrated in FIG. 6 by removable storage 606 and non-removable storage 608. In various embodiments, the memory 604 comprises non-transitory computer-readable memory 604 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 604 may also be described as computer storage media and may include volatile and nonvolatile, removable and non-removable media implemented in any method or technology for storage of information, such as computer readable instructions, data structures, program modules, or other data. The memory 604, removable storage 606 and non-removable storage 608 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the processor(s) 602. In some configurations, any or all of the memory 604, removable storage 606, and non-removable storage 606 can store modules 610, including programming instructions, data structures, program modules, and the like, as well as data 612, which, when executed by the processor(s) 602, implement some or all of the processes described herein.

The computing device 600 can also comprise input device(s) 614, such as a touch screen, keyboard, pointing devices (e.g., mouse, touch pad, joystick, etc.), pen, microphone, physical buttons, etc., through which a user can enter commands, information, and user input into the computing device 600.

The computing device 600 can further include one or more output devices 616 for providing output to a user of the computing device 600. The output device(s) 616 can comprise, without limitation, a display, speakers, tactile feedback mechanisms, a printer, and so on.

The computing device 600 can further include communication connections 618 (or communication interfaces 618) that allow the computing device 600 to communicate with other computing devices 620, such as over a network 106 when the computing device 600 is operated in a networked environment, such as over the Internet. The communication connections 618 are usable to, among other things, transmit/receive data over a network to/from the other devices 620, such as one or more computing devices, one or more servers, and so on. Additionally, the communications connection(s) 618 can enable WiFi-based communication such as via frequencies defined by the IEEE 802.11 standards, short range wireless frequencies such as Bluetooth®, or any suitable wired or wireless communications protocol that enables the computing device 600 to interface with the other devices 620.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A electronic device comprising:
one or more processor; and
memory storing a bootloader and computer-executable instructions that, when executed by the one or more processors, cause the electronic device to:
send, over a computer network, a request for an eligibility status of a user of the electronic device to unlock the bootloader, the request including an identifier associated with the user;
receive a response to the request indicating that the user is eligible to unlock the bootloader;
receive user input requesting to unlock the bootloader;
send, over the computer network and based at least in part on the user input, an acknowledgement that the user requested to unlock the bootloader;
receive a token;
perform a first reboot of the electronic device;
unlock the bootloader based at least in part on the token;
perform a second reboot of the electronic device; and
based at least in part on unlocking the bootloader, refrain from performing an update procedure that checks for, and downloads, available software updates for the electronic device over the computer network.

2. The electronic device of claim 1, wherein the computer-executable instructions further cause the electronic device to, after receiving the user input requesting to unlock the bootloader, set a flag within a trusted execution environment of the electronic device to indicate that the bootloader has been unlocked.

3. The electronic device of claim 2, wherein the computer-executable instructions further cause the electronic device to:
prior to setting the flag and prior to unlocking the bootloader, perform, by an over-the-air (OTA) handler executable on the electronic device, the update procedure at least once to check for, and download, an available software update for the electronic device over the computer network; and
after setting the flag, determine, by the OTA handler, that the flag, indicating that the bootloader has been unlocked, has been set within the trusted execution environment prior to refraining from performing the update procedure, wherein refraining from performing the update procedure occurs after, and is based at least in part, on the flag being set.

4. The electronic device of claim 1, wherein the computer-executable instructions further cause the electronic device to, prior to receiving the user input, present, on a display of the electronic device, information indicating a consequence of providing the user input requesting to unlock the bootloader, the consequence including at least one of: (i) voiding a warranty associated with the electronic device, (ii) the electronic device becoming ineligible for trade-in or resale at an authorized device dealer, or (iii) disabling software updates for the electronic device.

5. The electronic device of claim 1, wherein the computer-executable instructions further cause the electronic device to, after receiving the user input and prior to sending the acknowledgement, authenticate the user via an authentication procedure using the electronic device.

6. The electronic device of claim 1, wherein the computer-executable instructions further cause the electronic device to, after receiving the token, persist the token in a trusted execution environment of the electronic device, wherein unlocking the bootloader based at least in part on the token further comprises confirming a presence of the token in the trusted execution environment in response to performing the first reboot.

7. The electronic device of claim 1, wherein the identifier comprises at least one of a Mobile Station International Subscriber Directory Number (MSISDN) or an International Mobile Equipment Identity (IMEI).

8. The electronic device of claim 1, wherein performing the first reboot comprises rebooting into a bootloader stage.

9. The electronic device of claim 1, wherein performing the second reboot comprises rebooting into an operating system stage.

10. A computer-implemented method comprising:
receiving, from an electronic device over a computer network, a request for an eligibility status of a user of the electronic device to unlock a bootloader of the electronic device, the request including an identifier associated with the user;
accessing user data associated with the user or device data associated with the electronic device based at least in part on the identifier;
determining that the user is eligible to unlock the bootloader based at least in part on a set of eligibility rules being satisfied by the user data or the device data;
sending, to the electronic device, a response to the request indicating that the user is eligible to unlock the bootloader;
receiving, from the electronic device, an acknowledgement that the user requested to unlock the bootloader;
sending a token to the electronic device, the token being usable to unlock the bootloader;
updating a status associated the electronic device to an updated status; and
based at least in part on the status, refraining from providing available software updates for the electronic device over the computer network.

11. The computer-implemented method of claim 10, wherein the set of eligibility rules are satisfied if the user data or the device data indicates that the user has been in good standing with a service provider for at least a period of time.

12. The computer-implemented method of claim 10, further comprising sending a notification message to the user regarding the updated status.

13. The computer-implemented method of claim 10, wherein updating the status comprises updating a database with information indicating at least one of: (i) a warranty associated with the electronic device is void, (ii) the electronic device is ineligible for trade-in or resale at an authorized device dealer, or (iii) software updates should not be provided to the electronic device.

14. The computer-implemented method of claim 10, wherein the identifier comprises at least one of a Mobile Station International Subscriber Directory Number (MSISDN) or an International Mobile Equipment Identity (IMEI).

15. A computer-implemented method comprising:
    booting an electronic device;
    determining that a trusted execution environment of the electronic device does not contain a token usable to unlock a bootloader of the electronic device;
    determining that the electronic device has been tampered with; and
    based at least in part on determining that:
        the trusted execution environment does not contain the token; and
        the electronic device has been tampered with:
            sending, by the electronic device over a computer network, an instruction to update a status associated with the electronic device; and
            refraining from performing an update procedure that checks for, and downloads, available software updates for the electronic device over the computer network,
    wherein the determining that the electronic device has been tampered with is based on at least one of:
        that the bootloader has been unlocked;
        that an operating system of the electronic device has been modified; or
        that a kernel of the electronic device has been modified.

16. The computer-implemented method of claim 15, further comprising:
    setting a flag within the trusted execution environment to indicate that the electronic device has been tampered with,
    wherein sending the instruction to update the status is based at least in part on the flag being set to indicate that the electronic device has been tampered with.

17. The computer-implemented method of claim 16, further comprising:
    prior to setting the flag, performing, by an over-the-air (OTA) handler executing on the electronic device, the update procedure at least once to check for, and download, an available software update for the electronic device over the computer network; and
    after setting the flag, determining, by the OTA handler, that the flag, indicating that the electronic device has been tampered with, has been set within the trusted execution environment prior to refraining from performing the update procedure, wherein refraining from performing the update procedure occurs after, and is based at least in part, on the flag being set.

18. The computer-implemented method of claim 15, wherein determining that the electronic device has been tampered with comprises:
    determining a current hash signature of a system image installed on the electronic device; and
    determining that the current hash signature and a hash signature of the system image that is on record for the electronic device do not match.

19. The computer-implemented method of claim 18, further comprising receiving the hash signature of the system image that is on the record over the computer network.

* * * * *